US010203210B1

United States Patent
Tagawa

(10) Patent No.: US 10,203,210 B1
(45) Date of Patent: Feb. 12, 2019

(54) SYSTEMS AND METHODS FOR ROAD SCENE CHANGE DETECTION USING SEMANTIC SEGMENTATION

(71) Applicant: Toyota Research Institute, Inc., Los Altos, CA (US)

(72) Inventor: Takaaki Tagawa, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/803,236

(22) Filed: Nov. 3, 2017

(51) Int. Cl.
| G01C 21/32 | (2006.01) |
| G06K 9/00 | (2006.01) |
| G06K 9/62 | (2006.01) |
| G06K 9/72 | (2006.01) |

(52) U.S. Cl.
CPC ......... G01C 21/32 (2013.01); G06K 9/00791 (2013.01); G06K 9/6228 (2013.01); G06K 9/6261 (2013.01); G06K 9/6267 (2013.01); G06K 9/726 (2013.01)

(58) Field of Classification Search
CPC .. G01C 21/32; G06K 9/00791; G06K 9/6228; G06K 9/6261; G06K 9/6267; G06K 9/726; G08G 1/202; G06G 10/10
USPC ........................................................ 701/450
See application file for complete search history.

(56) References Cited

U.S. PATENT DOCUMENTS

| 7,336,803 | B2 | 2/2008 | Mittal et al. |
| 7,953,280 | B2 | 5/2011 | Theiler et al. |
| 8,167,430 | B2 | 5/2012 | Cobb et al. |
| 8,948,501 | B1 | 2/2015 | Kim et al. |
| 8,995,718 | B2 | 3/2015 | Sethuraman et al. |
| 9,111,148 | B2 | 8/2015 | Seow et al. |
| 9,396,552 | B1 | 7/2016 | Kloer |
| 9,612,123 | B1 | 4/2017 | Levinson et al. |
| 2004/0113772 | A1* | 6/2004 | Hong Chou ........... G06Q 10/10 340/539.13 |

(Continued)

OTHER PUBLICATIONS

Alcantarilla, Pablo Fernández et al. "Street-View Change Detection with Deconvolutional Networks." Robotics: Science and Systems(2016).

(Continued)

Primary Examiner — Gertrude Arther Jeanglaude
(74) Attorney, Agent, or Firm — Christopher G. Darrow; Darrow Mustafa PC

(57) ABSTRACT

System, methods, and other embodiments described herein relate to identifying changes to a location. In one embodiment, a method includes, in response to receiving current sensor data about the location, extracting a semantic feature distribution from the current sensor data according to a semantic-change model that identifies sensed integral features and sensed transient features from the current sensor data. The method includes identifying a scene change to the location by determining whether the sensed integral features differ from learned integral features of a normal distribution that indicates both learned integral features and learned transient features of the location. The method includes updating a map of the location in response to identifying that one or more of the sensed integral features differ from the learned integral features of the normal distribution. The method includes controlling one or more vehicle systems of the vehicle according to the map.

20 Claims, 6 Drawing Sheets

(56) References Cited

U.S. PATENT DOCUMENTS

2009/0216912 A1* 8/2009 Lee .................. G06F 9/4411
710/3
2010/0303158 A1 12/2010 Lin
2017/0124476 A1 5/2017 Levinson et al.

OTHER PUBLICATIONS

John Shackleton, Brian VanVoorst, and Joel Hesch. 2010. Tracking People with a 360-Degree Lidar. In Proceedings of the 2010 7th IEEE International Conference on Advanced Video and Signal Based Surveillance (AVSS '10). IEEE Computer Society, Washington, DC, USA, 420-426. DOI=http://dx.doi.org/10.1109/AVSS.2010.52.

* cited by examiner

SYSTEMS AND METHODS FOR ROAD SCENE CHANGE DETECTION USING SEMANTIC SEGMENTATION

TECHNICAL FIELD

The subject matter described herein relates in general to systems for identifying changes to a road scene and, more particularly, to using an unsupervised road scene change detection approach that learns transient features in order to identify significant/integral changes to a locality.

BACKGROUND

Vehicles may be equipped with many sensors that allow the vehicles to perceive other vehicles, obstacles, pedestrians, and other features of a surrounding environment. Moreover, the vehicles can use information about perceived features in the surrounding environment to localize the vehicle within the environment. That is, the vehicle can correlate perceived features (e.g., road markings, terrain, etc.) with mapped features to determine a position of the vehicle within the environment. This process is generally referred to as simultaneous localization and mapping (SLAM) and produces a map with position information for the mapped features that is a basis for comparison to perform the localization.

However, as aspects of an environment change from construction or other causes, the changes can cause difficulties with features of the map not aligning as expected thereby resulting in reduced accuracy and other difficulties with localizing the vehicle according to the map. Moreover, dynamic changes within the environment such as traffic at different times of the day (e.g., rush hour), weather (e.g., snow), seasonal changes (e.g., leaves on trees), temporary structures (e.g., tents) and other transient aspects can complicate detecting changes to more integral or static aspects of the environment such as roadways, terrain, buildings, etc. and may interfere with maintaining an accurate portrayal of the environment using the map. Consequently, accurately identifying changes within an environment presents many difficulties.

SUMMARY

Example systems and methods are disclosed herein that relate to a manner of road scene change detection using semantic segmentation. For example, in one aspect, a deep learning approach is implemented that uses awareness of temporal aspects of the environment in order to learn aspects about the environment so that transient changes and integral changes can be separately recognized. In this way, the mapping system improves accuracy and the reliability of map data through better detection of changes. Accordingly, in one embodiment, sensor data about a particular location is aggregated from different times and different days. In one approach, the sensor data is crowd-sourced from multiple vehicles that acquire observations of a location at different times and days in order to collect a sample of information about the location that is representative of different temporal conditions that may be experienced. Thus, in one embodiment, the information is accumulated over days, weeks, and/or longer periods of time and then analyzed.

For example, a mapping system analyzes the aggregated sensor data using a deep learning approach such as a semantic-change model that is compromised of two models. In one embodiment, the semantic-change model includes a semantic segmentation model that is pretrained with images to extract features from the sensor data and a change detection model to identify temporal aspects about the extracted features (e.g., transient vs. integral). In general, the aggregated sensor data is timestamped according to a day and a time at which the data was originally collected. Thus, the mapping system uses the change detection model of the semantic-change model to learn aspects of the location and, more specifically, to learn transient features that are time-dependent and changing in order to focus on integral features of the location that are more permanent. Accordingly, the mapping system can produce a normal distribution of the location that is a learned representation of the location and includes information about both the integral features, which are generally consistent features of the location, and transient features of the location, which are temporally dependent aspects that may change between observations.

Thus, the mapping system uses the semantic-change model to learn features of the location and build awareness about common/transient changes such as traffic, and other temporary changes that are encountered at different times. Consequently, when the mapping system acquires current sensor data about the location along with a timestamp or other temporal indicator associated with when the current sensor data was collected, the mapping system is capable of distinguishing between the noted transient aspects of the environment and integral aspects that are more consistent between observations. By leveraging this information, the mapping system identifies when changes occur to the integral features as opposed to identifying the transient features as changes. Accordingly, the mapping system identifies whether the current sensor data includes scene changes that are to the integral features and then extrapolates the scene changes into feature-based maps of the location, road maps, and/or other data that tracks the location. In this way, the mapping system provides an improved mechanism for change detection that accurately identifies substantive changes while avoiding transient artifacts.

In one embodiment, a mapping system for identifying changes to a location is disclosed. The mapping system includes one or more processors and a memory that is communicably coupled to the one or more processors. The memory stores a monitoring module including instructions that when executed by the one or more processors cause the one or more processors to, in response to receiving current sensor data about the location, extract a semantic feature distribution from the current sensor data according to a semantic-change model that identifies sensed integral features and sensed transient features from the current sensor data associated with the location. The memory stores a feature module including instructions that when executed by the one or more processors cause the one or more processors to identify a scene change to the location by determining whether the sensed integral features differ from learned integral features of a normal distribution that indicates both learned integral features and learned transient features of the location. The feature module includes instructions to update a map of the location in response to identifying that one or more of the sensed integral features of the semantic feature distribution differ from the learned integral features of the normal distribution. The feature module includes instructions to control one or more vehicle systems of the vehicle according to the map.

In one embodiment, a non-transitory computer-readable medium for identifying changes to a location is disclosed. The non-transitory computer-readable medium stores instructions that when executed by one or more processors cause the one or more processors to perform the disclosed functions. The instructions include instructions to, in response to receiving current sensor data about the location, extract a semantic feature distribution from the current sensor data according to a semantic-change model that identifies sensed integral features and sensed transient features from the current sensor data associated with the location. The instructions include instructions to identify a scene change to the location by determining whether the sensed integral features differ from learned integral features of a normal distribution that indicates both the learned integral features and learned transient features of the location. The instructions include instructions to update a map of the location in response to identifying that one or more of the sensed integral features of the semantic feature distribution differ from the learned integral features of the normal distribution. The instructions include instructions to control one or more vehicle systems of the vehicle according to the map.

In one embodiment, a method of identifying changes to a location is disclosed. The method includes, in response to receiving current sensor data about the location, extracting a semantic feature distribution from the current sensor data according to a semantic-change model that identifies sensed integral features and sensed transient features from the current sensor data associated with the location. The method includes identifying a scene change to the location by determining whether the sensed integral features differ from learned integral features of a normal distribution that indicates both learned integral features and learned transient features of the location. The method includes updating a map of the location in response to identifying that one or more of the sensed integral features differ from the learned integral features of the normal distribution. The method includes controlling one or more vehicle systems of the vehicle according to the map.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
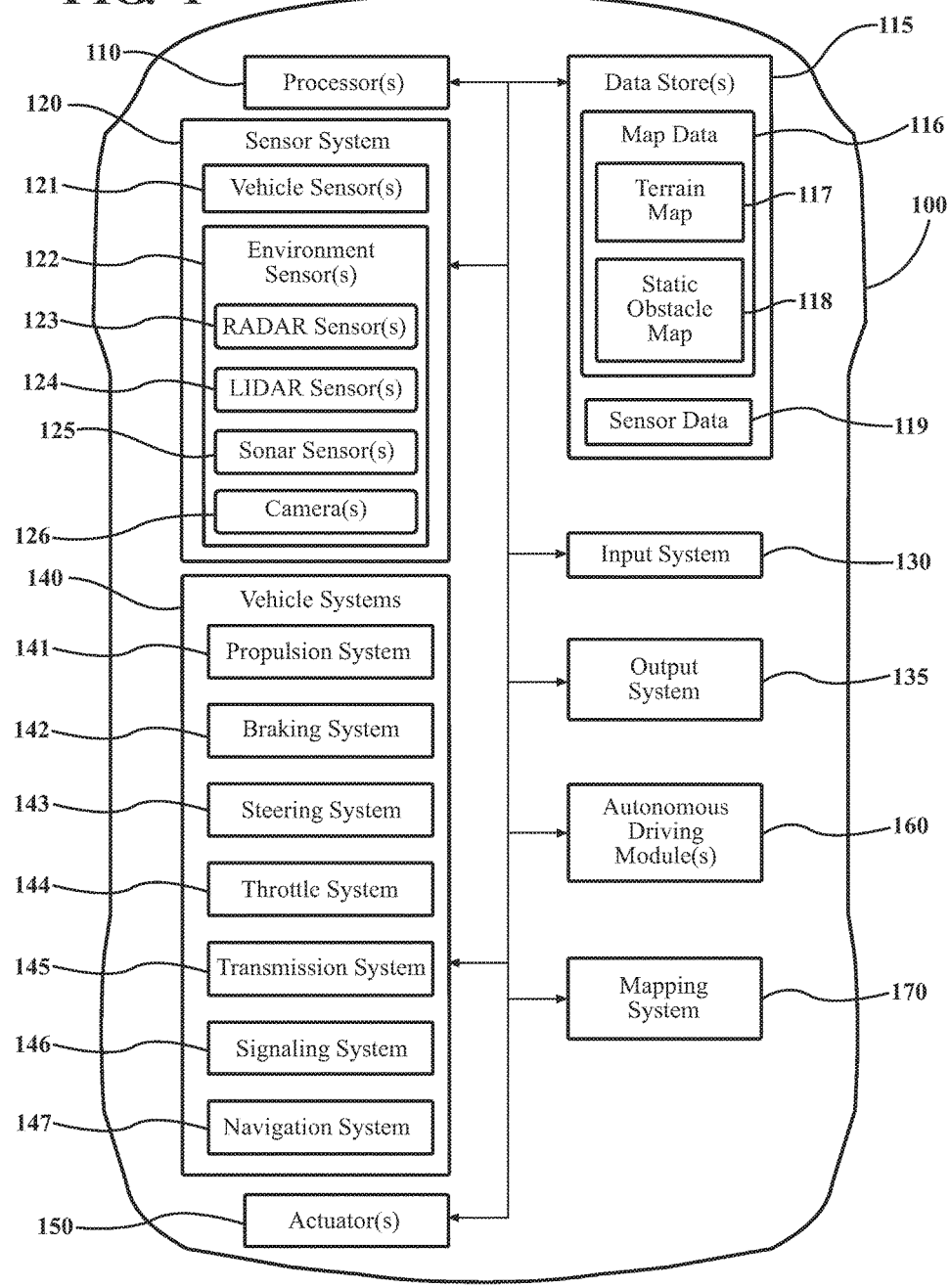
FIG. 1 illustrates one embodiment of a vehicle within which systems and methods disclosed herein may be implemented.

Systems, methods and other embodiments associated with identifying road scene changes using a semantic-change model to improve awareness of transient features and determine when integral changes occur are disclosed herein. As mentioned previously, because of capabilities of various sensors in a vehicle and temporal changes within a location, temporary objects/changes in the location can at times be mistaken for actual changes to features of the location. For example, when traffic is present at a location, the additional vehicles within an image of the location may, in some instances, be mistaken for changes to the location itself. Similarly, season changes such as snow, leaves on trees, and so on can also cause difficulties when detecting integral changes to the location. Further examples of transient aspects of the location that may interfere with detecting integral changes can include pedestrians, temporary structures (e.g., tents), temporary signs (e.g., construction signs), construction, and so on.

Therefore, in one embodiment, a mapping system learns both transient and integral features of a location in order to improve identification of changes to the integral features. For example, in one aspect, the mapping system implements a deep learning approach that uses aggregated sensor data that is time-stamped according to when the sensor data was acquired. In one approach, the sensor data is crowd-sourced from multiple vehicles/robots that observe a location at different times and days in order to collect a sample of information about the location that is representative of different conditions that may be commonplace for the different times. Thus, in one embodiment, the information is accumulated over days, weeks, and/or longer periods of time and then analyzed by the mapping system. For example, the mapping system analyzes the aggregated sensor data using a machine learning algorithm (e.g., deep learning model). Thus, the mapping system uses the learning algorithm to learn aspects of the location and, more specifically, to learn a normal distribution for the location that includes transient features, which are time-dependent and changing, and integral features, which are generally consistent features of the location.

As such, the mapping system uses the learning algorithm to learn features of the location and build awareness about features that are encountered at different times. By learning these aspects of the location, the mapping system can discriminate between noted transient aspects of the environment and integral aspects that are more consistent between observations when analyzing currently acquired sensor data. Thus, the mapping system leverages this information to identify when changes occur to the integral features of the normal distribution as opposed to identifying the transient features as changes. Accordingly, the mapping system identifies whether the current sensor data includes scene changes that are to the integral features and then extrapolates the scene changes into a feature-based map of the location, road maps, and/or other data about the location. In this way, the mapping system provides an improved mechanism for change detection that accurately identifies substantive changes while avoiding transient artifacts.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles and the noted mapping system 170 can be implemented apart from the vehicle 100 as a centralized server, a cloud-based service, and so on. Moreover, in some implementations, the vehicle 100 may be any other form of motorized transport that, for example, benefits from the systems and methods as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a mapping system 170 that is implemented to perform methods and other functions as disclosed herein relating to identifying road scene changes according to a normal distribution that is learned through characterizing aggregated sensor data as a function of a deep learning algorithm. The noted functions and methods will become more apparent with a further discussion of the figures.

Figure 2:
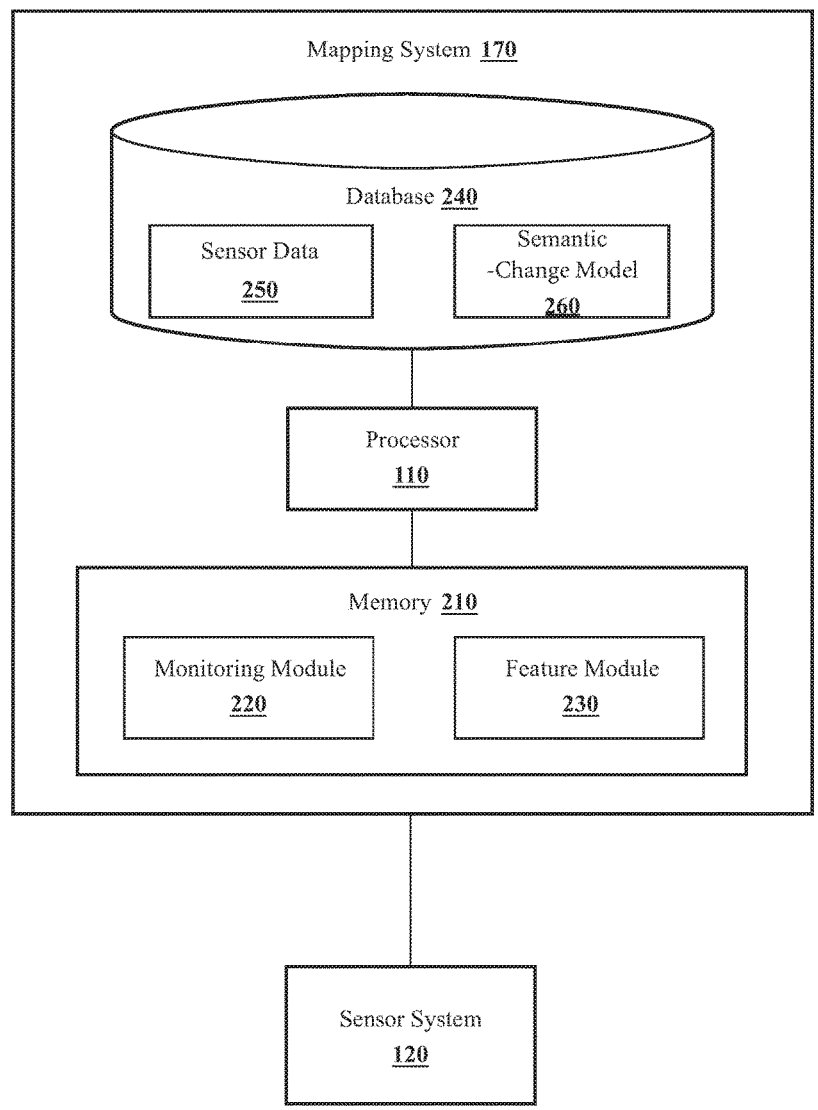
FIG. 2 illustrates one embodiment of a mapping system that is associated with identifying integral changes to a location using a semantic-change model.

With reference to FIG. 2, one embodiment of the mapping system 170 of FIG. 1 is further illustrated. The mapping system 170 is shown as including a processor 110 from the vehicle 100 of FIG. 1. Accordingly, the processor 110 may be a part of the mapping system 170, the mapping system 170 may include a separate processor from the processor 110 of the vehicle 100 or the mapping system 170 may access the processor 110 through a data bus or another communication path. In either case, the processor 110 is illustrated as part of the mapping system 170 for purposes of explanation. Additionally, in one embodiment, the mapping system 170 includes a memory 210 that stores a monitoring module 220 and a feature module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, in one embodiment, the monitoring module 220 generally includes instructions that function to control the processor 110 to acquire sensor data 250 from, for example, one or more vehicle sensors of the sensor system 120. In one embodiment, the sensor data 250 includes data collected from a GPS of a navigation system 147, a camera 126, a sonar 125, a LIDAR 124, a radar 123, and/or another sensor integrated with the vehicle 100. In further aspects, the monitoring module 220 controls multiple iterations of the noted sensors that are embedded with the vehicle 100.

In either case, the monitoring module 220 collects information that comprises the sensor data 250. In various implementations, the monitoring module 220 acquires the sensor data 250 from various sources. For example, the monitoring module 220 can acquire the sensor data 250 from multiple different vehicles that drive through a location, or from a single vehicle that drives through the location over multiple instances. In further aspects, the sensor data 250 may be acquired from autonomous vehicles, robots, stationary devices (e.g., infrastructure cameras), and/or other devices. As a general matter, the sensor data 250 is an electronic perception of a location that is obtained along with a timestamp that identifies a day and a time from when an associated device captured the respective data.

Moreover, while the sensor data 250 is generally discussed in a monolithic sense, the sensor data 250 is comprised of a plurality of separate observations for a location that are from different times and days in order to capture a comprehensive view of the location and transient versus integral aspects of the location. Additionally, while the sensor data 250 and the general functionality of the mapping system 170 is discussed in relation to a single location, the mapping system 170 generally executes the same functions for other locations and, thus, a single location is discussed for purposes of brevity. Furthermore, while the sensor data 250 is generally discussed as including different types of data (e.g., images, lidar, radar, etc.), in one embodiment, the sensor data 250 includes a single type of sensor data such as visible light images in order to streamline design and implementation of the deep learning algorithm that is employed to analyze the sensor data 250.

Moreover, while not illustrated in FIG. 2, the discussed integral features generally correlate with features in a feature-based map or other map (e.g., road map) that is used by various systems of the vehicle 100 for different purposes. For example, the autonomous driving module 160 and/or other components may use the noted map for simultaneous localization and mapping (SLAM), for object detection, path planning, and so on. In general, the mapping system 170 and/or another component uses the sensor data 250 to generate and update the mapping of a surrounding environment of the vehicle 100. The mapping can include locations of objects, terrain, and other aspects of the surrounding environment perceived by the vehicle sensors that is useful in navigating and generally discriminating between aspects of the surrounding environment.

As a further matter prior to discussing additional aspects of identifying road scene changes, in one embodiment, the mapping system 170 includes a database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes the sensor data 250 and the semantic-change model 260. Additionally, while the sensor data 250 and the semantic-change model 260 are illustrated as being stored within the database 240, it should be understood that in various embodiments the sensor data 250 and/or the semantic-change model 260 can be stored in the memory 210, integrated within one or more data structures of the monitoring module 220 and/or the feature module 230, and so on.

Accordingly, in one embodiment, the monitoring module 220 controls a communication sub-system to receive communications with the sensor data 250 and/or directly acquires the sensor data 250 using one or more of the vehicle sensors 120. In either case, the monitoring module 220 acquires the sensor data 250 and electronically stores the sensor data 250 in the database 240. The feature module 230 generally includes computer-executable instructions to analyze the aggregated sensor data 250 using the semantic-change model 260 in order to learn and generate a normal distribution for the location. That is, the feature module 230 processes the aggregated sensor data 250 that has been collected from different days and times in order to learn the distribution of features for the location. Thus, the normal distribution is a learned distribution of features for the location as characterized by the feature module 230 applying the semantic-change model 260 to the sensor data 250. As such, the feature module 230 analyzes the sensor data 250 using the included timestamps to learn transient features that are common to particular times of day and/or days of the week/month/year.

Moreover, the feature module 230 also learns integral features that are consistent within the location and do not vary temporally in the same manner as the transient features. For example, the feature module 230 learns aspects of the roadway (e.g., lane markings), shapes (e.g., path, curvature, etc.) of the roadway, objects and aspects of the adjoining terrain (e.g., hills, etc.), buildings, traffic lights/signs, and so on. These exemplary integral features illustrate aspects of the location that are generally considered to be consistent over a span of time and, therefore, are at least semi-static in relation to the location. Accordingly, the mapping system 170 considers the integral aspects as mapped features (e.g., features included within a feature-based or other map) of the location whereas the transient features are ephemeral aspects that vary over time and are generally not included as aspects of a feature-based map or another mapping. In either case, the normal distribution is a learned distribution of both the transient features and the integral features of the location as generated by the feature module 230 applying the semantic-change model 260 to the aggregated sensor data 250.

While the semantic-change model 260 is generally discussed as being a monolithic/atomic structure, in one embodiment, the semantic-change model 260 is comprised of two discrete machine learning models that function sequentially to provide the noted functionality. For example, the semantic-change model 260 is comprised of a semantic segmentation model and a change detection model. The feature module 230, in one embodiment, implements the semantic segmentation model to extract semantic feature distributions from the sensor data 250. Moreover, the feature module 230, in one embodiment, leverages the change detection model to identify which of the extracted features are transient and integral features. In general, the change detection model is a machine learning algorithm such as a deep learning algorithm or another suitable approach that distinguishes between transient and integral features and, in one embodiment, identifies changes to between integral features of a location over time in order to detect map changes.

The semantic segmentation model is a deep learning algorithm that, for example, estimates a function $f$ that maps an input image (e.g., sensor data 250), such as $\varepsilon[0, \ldots, 255]H \times L$, to an output label image $\varepsilon[1, \ldots, N]H \times L$, where the labels $1, \ldots, N$ index a semantic class of the input at a pixel-level (e.g., road, sidewalk, sky, vegetation, pedestrians, etc.). Accordingly, in one embodiment, the feature module 230 using the semantic segmentation model produces a labeled version of each image that identifies different features therein. Moreover, in one embodiment, the semantic segmentation model is a deep convolutional neural network (CNNs) or combination of multiple neural networks. Additionally, the feature module 230 in combination with the change detection model learns from the extracted features in the form of a semantic feature distribution the integral and transient features and generates the normal distribution therefrom. Thus, while the semantic-change model 260 is referred to in the singular, the model 260 can be comprised of multiple separate networks that are, for example, each trained for a particular purpose. In one embodiment, the model 260 is a fully connected CNN, a long short-term memory network, a recurrent neural network, or another unsupervised deep learning algorithm or combination thereof.

Once the mapping system 170 produces the normal distribution for the location, the monitoring module 220 can analyze presently acquired sensor data to identify features of the location. Thus, in one embodiment, the monitoring module 220 generally includes computer-executable instructions to acquire current sensor data. In general, the current sensor data is stored with the sensor data 250 and is generally referred to as the same herein. Additionally, the monitoring module 220, in response to receiving the current sensor data, extracts a semantic feature distribution from the current sensor data according to the semantic-change model 260. The semantic feature distribution is, in general, a mapping of identified/classified features and relationships between features within the location for the current sensor data. In general, the monitoring module 220 leverages the semantic-change model 260 to classify the features embodied within the sensor data 250 (e.g., image) that is currently acquired. Thus, the monitoring module 220, in one embodiment, produces the semantic feature distribution with both integral and transient features that have been sensed within the sensor data 250.

Consequently, the feature module 230 can use the semantic feature distribution for the current sensor data 250 to determine whether the integral features that are presently sensed differ from the learned integral features of the normal distribution and thus represent a scene change for the location. It should be noted, that because the semantic-change model 260 and the feature module 230 learn the transient features of the location in producing the normal distribution, the feature module 230 can subsequently segment the sensed transient features from the semantic feature distribution and thereby compare the integral features in isolation to identify whether there is a scene change for the location. In this way, the mapping system 170 improves identification of changes to the location by avoiding the identification of transient features as substantive changes when the transient features are simply ephemeral aspects of the location.

In either case, the feature module 230, in one embodiment, updates a map (e.g., feature-based map) of the location upon determining that the current sensor data 250 includes information identifying changes to integral aspects of the location. As a result of updating the map, the feature module 230 can effectively control various systems of the vehicle 100 according to the map. That is, the feature module 230 provides the updated map which in turn causes the autonomous driving module 160, the navigation system 147, advanced driving assistance systems (ADAS), and/or other vehicle systems 140 to account for the features in the map and adjust outputs of various functions (e.g., path planning) according thereto. In this way, the mapping system improves the accuracy of the noted maps through improved detection of changes and thereby improved the operation of various vehicle systems.

Figure 3:
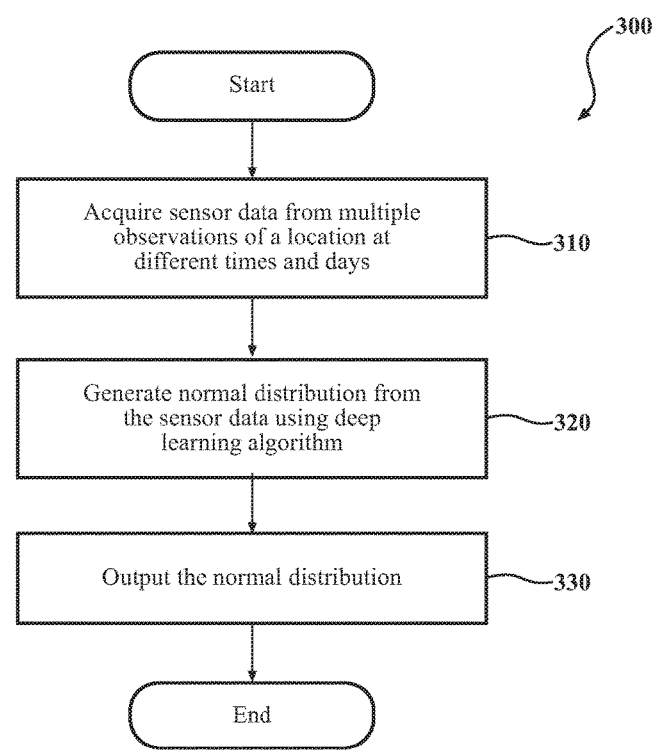
FIG. 3 is one example a method that is associated with training a semantic-change model to identify integral and transient features.

Additional aspects of analyzing aggregated sensor data to learn features of a location will be discussed in relation to FIG. 3. FIG. 3 illustrates a flowchart of a method 300 that is associated with automated and unsupervised learning of features in a location by using a deep learning algorithm to analyze timestamped sensor data. Method 300 will be discussed from the perspective of the mapping system 170 of FIGS. 1 and 2. While method 300 is discussed in combination with the mapping system 170, it should be understood that the method 300 is not limited to being implemented within the mapping system 170, but is instead one example of a system that may implement the method 300.

At 310, the monitoring module 220 aggregates the sensor data 250 over multiple observations of the location spanning different days and times of day. As previously indicated, the sensor data 250 is electronically formatted in a manner so as to include a timestamp from when the specific sensor data 250 was acquired. In general, the monitoring module 220 aggregates the sensor data 250 to acquire a comprehensive assessment of the location across different circumstances. That is, because certain aspects of the location are dynamic and change according to times of data, days of the week, and/or times of the year, the more sensor data 250 that the monitoring module 220 acquires, the more comprehensive of a characterization the mapping system 170 can produce from the sensor data 250.

Moreover, in general, the sources of the sensor data 250 aggregated by the monitoring module 220 are not limited to the vehicle 100 itself. Instead, the monitoring module 220 collects the aggregated sensor data 250 from remote sources and/or local sources (e.g., vehicle sensors 120). As such, the monitoring module 220 communicates with the remote sources via a communications network to obtain the sensor data 250.

At 320, the feature module 230 generates a normal distribution for the location using the sensor data 250. In one embodiment, the feature module 230 generates the normal distribution by analyzing the aggregated sensor data 250 according to the semantic-change model 260. Thus, the feature module 230 provides the sensor data 250 as an electronic input into the model 260. Accordingly, the model 260 generates a feature representation for each observation of the sensor data 250 and uses the timestamps to detect and learn features of the location. Thus, the feature module 230 in combination with the model 260 can discriminate between the different features to determine which features are temporally dependent and are thus then learned as transient features in comparison to features that are integral or consistent between observations of the location. In either case, the feature module 230 generates the normal distribution that includes learned transient and integral features of the location.

At 330, the feature module 230 outputs the normal distribution. In one embodiment, the feature module 230 outputs the normal distribution to the memory 210 or the database 240 in order to provide access to the normal distribution for subsequent analysis of current sensor data and determinations of changes to the location. It should be appreciated that the normal distribution is, in one embodiment, integrated, at least partially, within the model 260 as learned components of the model 260 itself. Thus, the normal distribution provides for learned aspects of the location that indicates both transient and integral features such that subsequent analysis of current sensor data can actively discriminate between the various types of features to determine when a change to the location has occurred.

Figure 4:
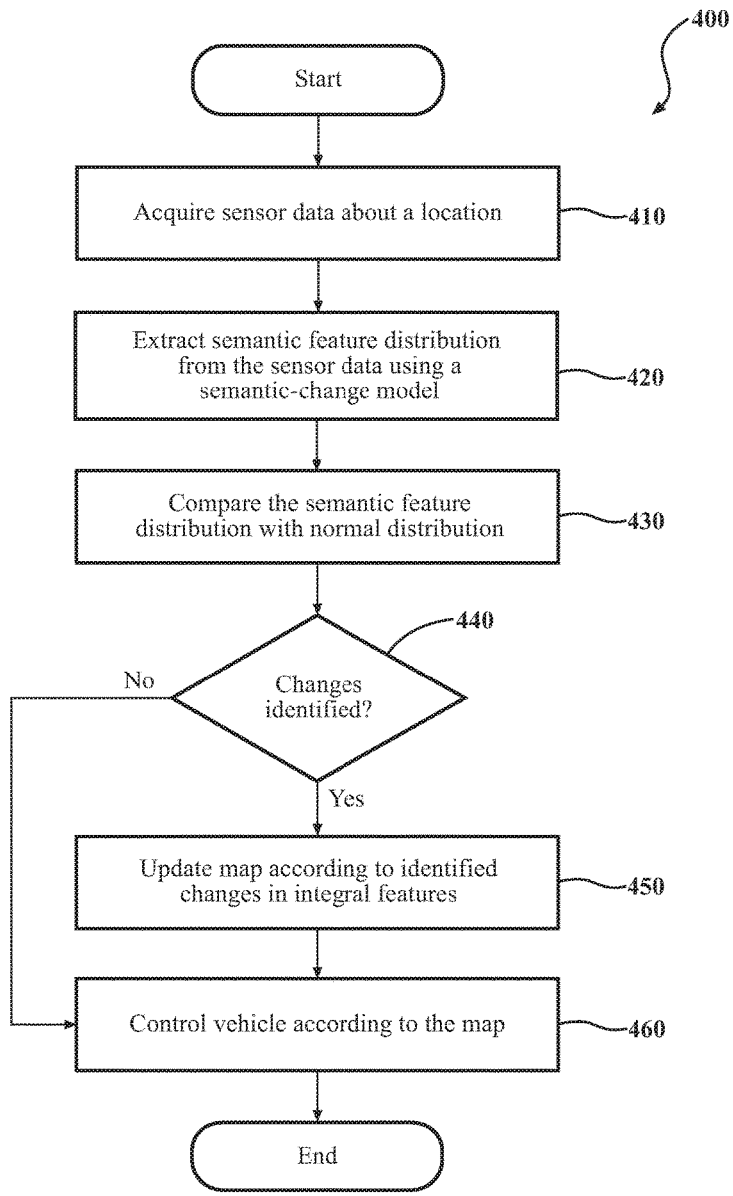
FIG. 4 illustrates a flow diagram of an example method that is associated with identifying transient and integral features of a location from current sensor data.

Additional aspects of detecting changes to a location will be discussed in relation to FIG. 4. FIG. 4 illustrates a flowchart of a method 400 that is associated with identifying changes to a location using sensor data. Method 400 will be discussed from the perspective of the mapping system 170 of FIGS. 1 and 2. While method 400 is discussed in combination with the mapping system 170, it should be understood that the method 400 is not limited to being implemented within the mapping system 170, but is instead one example of a system that may implement the method 400.

At 410, the monitoring module 220 receives current sensor data 250. In one embodiment, the current sensor data 250 is data that is obtained in real-time. In further aspects, the current sensor data 250 is the most recent data acquired by the monitoring module 220. In either case, the current sensor data 250 is, for example, a camera image of the location that includes at least a timestamp identifying a day and time of when the current sensor data 250 was acquired. Thus, the current sensor data 250 generally embodies a current condition of the location, which may include changes in comparison to previous acquisitions of the sensor data 250.

At 420, the monitoring module 220 extracts a semantic feature distribution from the current sensor data 250. In one embodiment, the monitoring module 220 uses the current sensor data 250 (e.g., an image) as an electronic input to the semantic-change model 260 that identifies sensed integral features and sensed transient features from the current sensor data 250. That is, the monitoring module 220 uses the semantic-change model 260 to identify features embodied within the current sensor data 250 and whether the features are transient or integral as learned by the semantic-change model 260 through the previously discussed training. Thus, the monitoring module 220 generates the semantic feature distribution that accounts for the learned transient features of the location.

The monitoring module 220 can determine which features identified in the current sensor data 250 are transient in order to focus analysis about the presence of the scene change on the sensed integral features. Accordingly, the monitoring module 220, in one embodiment, applies the semantic-change model 260 using a logical time scale that accounts for the learned transient features according to a timestamp associated with the current sensor data and ones of the learned transient features that are associated with the timestamp. In this way, the semantic feature distribution produced at 420 can accurately classify indicated features as being transient or integral and thus can focus the subsequent change analysis on the integral features instead of otherwise potentially misidentifying transient aspects as changes.

At 430, the feature module 230 compares the normal distribution with the semantic feature distribution generated from the current sensor data. In one embodiment, the feature module 230 identifies the sensed integral features from the semantic feature distribution that correlates with learned integral features of the normal distribution. Thus, the feature module 230 can indicate any sensed integral features that differ from the learned integral features as being potential scene changes.

At 440, the feature module 230 identifies whether the sensed integral features associated with the current sensor data 250 differ from the learned integral features. In one embodiment, the feature module 230 identifies which sensed integral features are distinct from the learned integral features to identify whether a change exists. Because the semantic-change model 260 classifies the transient features in the current sensor data 250 according to the particular timestamp as previously learned, the feature module 230 can segment the transient features from the analysis and instead focus on whether the sensed integral features correspond (e.g., match in location and shape). Moreover, where a sensed integral feature does not match the learned normal distribution of integral features, the feature module 230, in one example, can simply identify the distinct integral features as a change. In further aspects, the feature module 230 can undertake additional analysis of identified potential changes by, for example, executing additional feature identification, correlating the potential changes with known temporal events (e.g., storms, construction, etc.), or otherwise verifying that the identified changes are accurate.

If the feature module 230 determines that there is no change, at 440, then, the feature module 230 proceeds to control one or more vehicle systems as indicated at block 460. However, if the scene change embodied by the distinct integral feature is verified, then the feature module 230 proceeds to update a map at 450.

At 450, the feature module 430 updates a map. In one embodiment, the feature module 230 updates a feature-based map according to differences between the learned integral features as indicated in the normal distribution and the sensed integral features. Moreover, as part of processing the current sensor data 250 using the semantic-change model 260, the model 260 may also learn the changes of the sensed integral features and thereby adjust the normal distribution accordingly. In either case, the map is updated to reflect identified changes to the location that are substantive changes from modification to a roadway, terrain, nearby buildings, and/or similar changes as opposed to ephemeral changes that are randomly captured by the sensor data 250.

At 460, the feature module 230 controls one or more vehicle systems 140 of the vehicle 100 according to the map. As previously indicated, in one embodiment, the feature module 230 maintains the map in order to convey information about the surrounding environment to the vehicle 100 and to facilitate the vehicle 100 in generating various outputs. That is, for example, the feature module 230 provides the updated map to cause the autonomous driving module 160 to accurately localize the vehicle 100 within the location and to plan an appropriate path for autonomously controlling the vehicle 100. In further aspects, providing the updated map can cause/facilitate further actions such as route planning, obstacle avoidance, and so on. In either case, the mapping system 170 improves change detection and thus the operation of the vehicle 100 by improving the accuracy of map data through learning transient features and segmenting the transient features from change detection.

Figure 5:
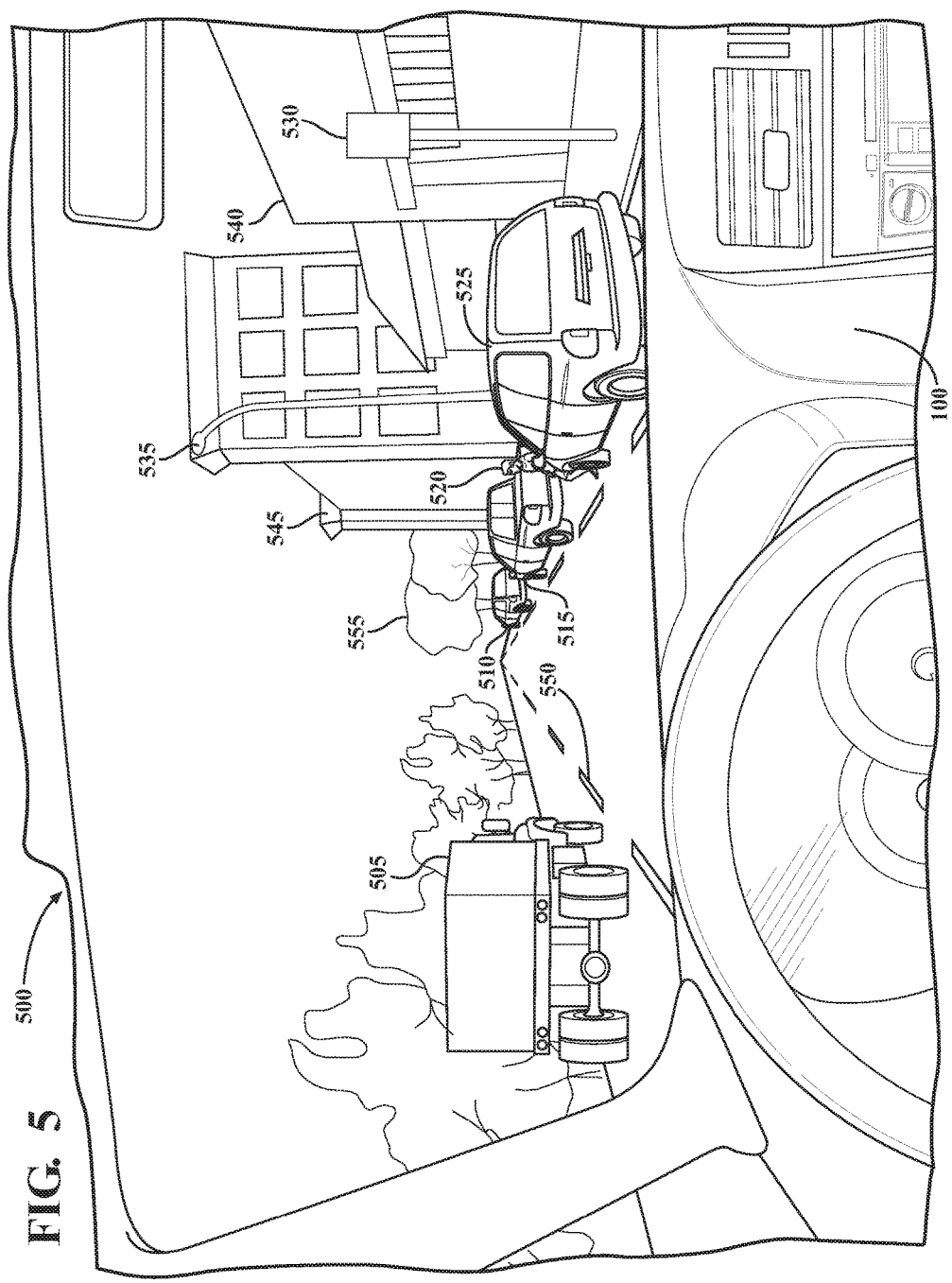
FIG. 5 illustrates an example view from a vehicle that may be captured by sensors of the vehicle.
Figure 6:
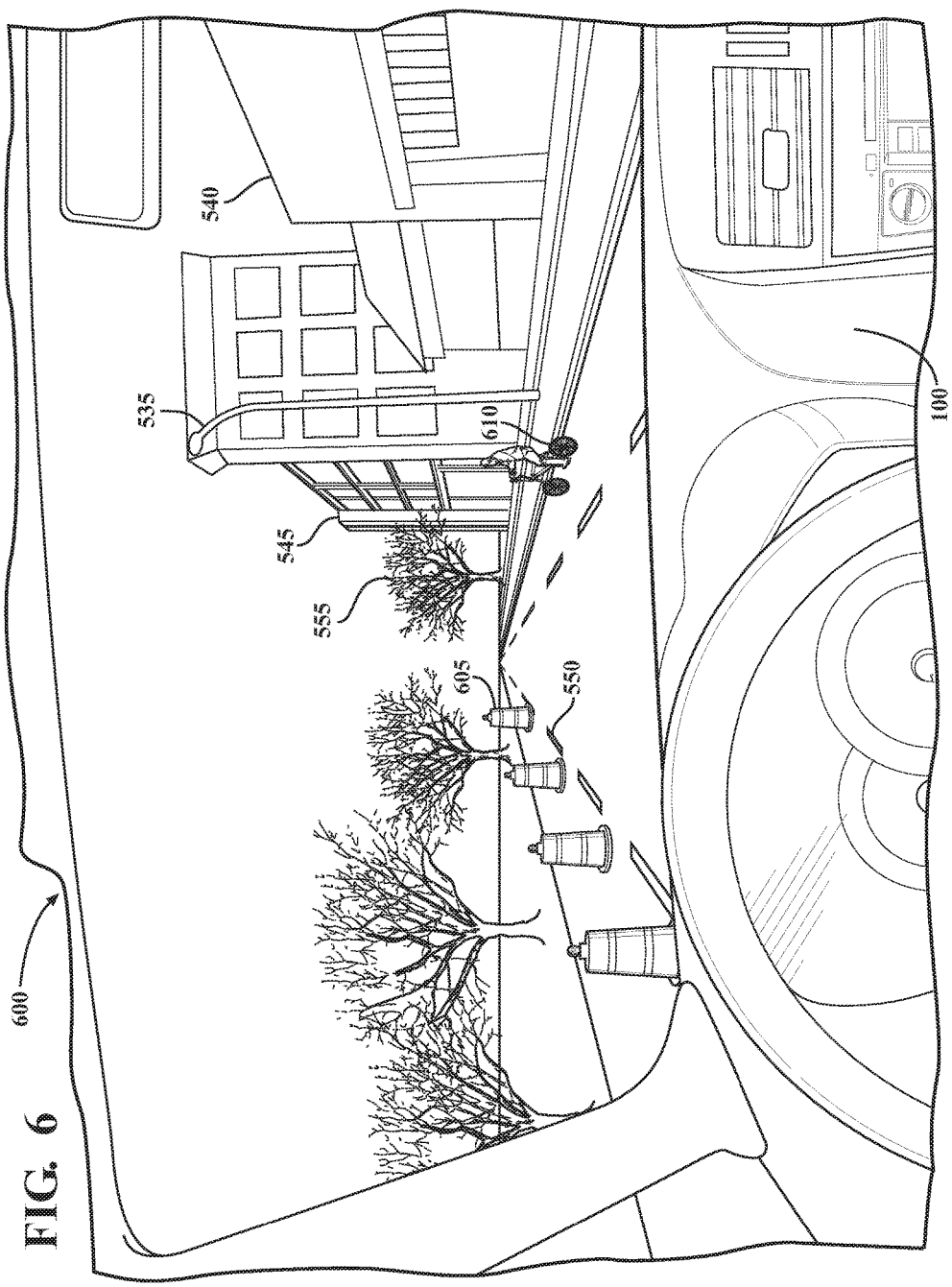
FIG. 6 is an additional example view from a vehicle of a subsequent observation of the location depicted in FIG. 5.

Further examples of how the mapping systems 170 analyzes sensor data and detects changes will be provided in relation to the subsequent FIGS. 5-6. As an initial matter, both of FIGS. 5 and 6 represent views through a windshield of a vehicle 100. Thus, the depicted features generally represent features that may be captured by a camera in an image. For example, FIG. 5 illustrates one embodiment of a view 500 from within the vehicle 100 through a windshield of the vehicle 100. In the view 500, several transient features are present as well as integral features. In particular, the view 500 includes a truck 505, cars 510, 515, 525, a pedestrian 520, a sign 530, a light post 535, a building 540, another building 545, lane markers 550, and trees 555. Thus, an image acquired from the vehicle 100 can include transient features 505-525 and integral features 530-555.

Accordingly, the mapping system 170, after acquiring sensor data 250 from multiple observations of the location depicted in the view 500, analyzes the sensor data 250 to learn aspects of the location. As such, mapping system 170 produces a normal distribution of the location that indicates transient features such as the cars 510, 515, 525 being commonly located as shown during permitted parking hours. Moreover, transient features such as the truck 505 are representative of traffic which is indicated as being likely for peak traffic hours in this location. Similarly, the normal distribution indicates a likelihood of the pedestrian crossing in the noted location during particular times. As an additional aspect of the normal distribution, the mapping system 170 learns the integral features 530-555 which are generally consistent over the acquired observations for the location.

By contrast, FIG. 6 depicts a subsequent observation of the same location depicted in FIG. 5. However, in the image shown in FIG. 6, the cars and pedestrian 510-525 are not present. Moreover, the truck 505 or any other traffic is also not present. However, construction barrels 605, and a bicyclist 610 are now present. Additionally, sign post 530 has been removed, and building 545 has been renovated and is now shaped differently. As an additional noteworthy change, the trees 555 are without leaves. Accordingly, as the mapping system 170 analyzes the present image of the view 600 for the location, and, in one embodiment, generates a semantic feature distribution for the location. Thus, the mapping system 170, in producing the semantic feature distribution, identifies and classifies the transient features and segments the transient features from the semantic feature distribution. Therefore, the bicyclist 610 and the construction barrels 605 are not considered to be changes since they are generally ephemeral or temporary. Moreover, the missing transient features from the previous image are also not considered to be changes due to the classification as transient and the knowledge of those features regularly moving into and out of the location. As an additional note, the construction barrels 605, in some implementations, may be indicative of an integral change depending on a longevity of placement, and/or whether additional changes (e.g., to the lane makers 550) occur concurrently therewith.

In either case, the mapping system 170 does identify the missing post 535 and the changes to the building 545 as changes to the learned integral features of the location. Accordingly, the changes are extrapolated to a feature-based map of the location in order to provide an up-to-date characterization. As a further matter, the mapping system 170 can also learn seasonal changes to integral features such as those embodied by the loss of leaves to the trees 555. Accordingly, even though the trees 555 are generally considered integral features of the location, the mapping system 170 can learn dynamic/transient aspects of the integral features according to observed patterns of change. As a further example, the mapping system 170 may learn seasonal decorations on buildings, changes to landscaping plantings, and so on.

However, the mapping system 170, in general, operates to avoid identifying transient features/changes as substantive modifications of the location and thus learns the transient and integral features and common changes thereto as a function of varying temporal aspects in order to accurately identify when changes do occur to the integral features.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., a human operator). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., operator) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the mapping system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the mapping system 170, and/or the autonomous driving module(s) 160 may control some or all of these vehicle systems 140 and, thus, may be partially or fully autonomous.

The processor(s) 110, the mapping system 170, and/or the autonomous driving module(s) 160 can be operatively connected to communicate with the various vehicle systems 140 and/or individual components thereof. For example, returning to FIG. 1, the processor(s) 110, the mapping system 170, and/or the autonomous driving module(s) 160 can be in communication to send and/or receive information from the various vehicle systems 140 to control the movement, speed, maneuvering, heading, direction, etc. of the vehicle 100. The processor(s) 110, the mapping system 170, and/or the autonomous driving module(s) 160 may control some or all of these vehicle systems 140.

The processor(s) 110, the mapping system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the mapping system 170, and/or the autonomous driving module(s) 160 can control the direction and/or speed of the vehicle 100. The processor(s) 110, the mapping system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the mapping system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the mapping system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system for identifying changes to a location, comprising:
   one or more processors;
   a memory communicably coupled to the one or more processors and storing:
   a monitoring module including instructions that when executed by the one or more processors cause the one or more processors to, in response to receiving current sensor data about the location, extract a semantic feature distribution from the current sensor data according to a semantic-change model that identifies sensed integral features and sensed transient features from the current sensor data associated with the location; and
   a feature module including instructions that when executed by the one or more processors cause the one or more processors to identify a scene change to the location by determining whether the sensed integral features differ from learned integral features of a normal distribution that indicates both learned integral features and learned transient features of the location,
   wherein the feature module includes instructions to update a map of the location in response to identifying that one or more of the sensed integral features of the semantic feature distribution differ from the learned integral features of the normal distribution, and
   wherein the feature module includes instructions to control one or more vehicle systems of the vehicle according to the map.

2. The mapping system of claim 1, wherein the feature module includes instructions to generate the normal distribution for the location as a function of aggregated sensor data collected over multiple observations of the location at different days and times of day, and
   wherein the aggregated sensor data is labeled with timestamps that indicate days and times for respective observations of the aggregated sensor data.

3. The mapping system of claim 2, wherein the feature module includes instructions to generate the normal distribution including instructions to analyze the aggregated sensor data according to the semantic-change model using the timestamps to detect and learn the learned transient features of the location that change according to varying temporal aspects of the location, and
   wherein the feature module includes instructions to generate the normal distribution for the location automatically and unsupervised using the aggregated sensor data.

4. The mapping system of claim 1, wherein the current sensor data includes at least camera images, wherein the learned integral features remain consistent over multiple observations of the location,
   wherein the semantic-change model accounts for the learned transient features within the normal distribution to segment the sensed transient features from the semantic feature distribution when detected and avoid indicating the scene change according to the sensed transient features, and
   wherein the sensed transient features are aspects of the location detected in the current sensor data that correlate with the learned transient features.

5. The mapping system of claim 1, wherein the semantic-change model characterizes aspects of the current sensor data to identify (i) the sensed integral features that correlate with the learned integral features and (ii) the sensed transient features that correlate with the learned transient features.

6. The mapping system of claim 1, wherein the feature module includes instructions to generate the semantic feature distribution to account for the learned transient features of the location and focus analysis of whether the current sensor data includes the scene change on the sensed integral features instead of the sensed transient features that are temporary.

7. The mapping system of claim 1, wherein the monitoring module includes instructions to extract the semantic feature distribution including instructions to apply the semantic-change model according to a logical time scale that accounts for the learned transient features according to a timestamp associated with the current sensor data and ones of the learned transient features that are associated with the timestamp.

8. The mapping system of claim 1, wherein the semantic-change model is comprised of a semantic segmentation model and a change detection model, wherein the semantic segmentation model is pretrained with images, wherein the monitoring module uses the semantic segmentation model to generate the semantic feature distribution, wherein the semantic segmentation model includes a fully connected convolutional neural network (FC-CNN), wherein the change detection model is trained using feature distributions produced by the semantic segmentation model and corresponding timestamps, and wherein the monitoring module applies the change detection model to classify features within the semantic feature distribution as the sensed integral features and the sensed transient features.

9. A non-transitory computer-readable medium storing for identifying changes to a location and including instructions that when executed by one or more processors cause the one or more processors to:

in response to receiving current sensor data about the location, extract a semantic feature distribution from the current sensor data according to a semantic-change model that identifies sensed integral features and sensed transient features from the current sensor data associated with the location;

identify a scene change to the location by determining whether the sensed integral features differ from learned integral features of a normal distribution that indicates both the learned integral features and learned transient features of the location;

update a map of the location in response to identifying that one or more of the sensed integral features of the semantic feature distribution differ from the learned integral features of the normal distribution; and control one or more vehicle systems of the vehicle according to the map.

10. The non-transitory computer-readable medium of claim 9, wherein the instructions include instructions to generate the normal distribution for the location as a function of aggregated sensor data collected over multiple observations of the location at different days and times of day, wherein the aggregated sensor data is labeled with timestamps that indicate days and times for respective observations of the aggregated sensor data, wherein the instructions to generate the normal distribution include instructions to analyze the aggregated sensor data according to the semantic-change model using the timestamps to detect and learn the learned transient features of the location that change according to varying temporal aspects of the location, and wherein the instructions to generate the normal distribution for the location include instructions to generate the normal distribution automatically and unsupervised using the aggregated sensor data.

11. The non-transitory computer-readable medium of claim 9, wherein the current sensor data includes at least camera images, wherein the learned integral features are features that remain consistent over multiple observations of the location, wherein the semantic-change model accounts for the learned transient features within the normal distribution to segment the sensed transient features from the semantic feature distribution when detected and avoid indicating the scene change according to the sensed transient features, and wherein the sensed transient features are aspects of the location detected in the current sensor data that correlate with the learned transient features.

12. The non-transitory computer-readable medium of claim 9, wherein the semantic-change model characterizes aspects of the current sensor data to identify (i) the sensed integral features that correlate with the learned integral features and (ii) the sensed transient features that correlate with the learned transient features, and wherein the instructions to generate the semantic feature distribution account for the learned transient features of the location and focus analysis of whether the current sensor data includes the scene change on the sensed integral features instead of the sensed transient features that are temporary.

13. The non-transitory computer-readable medium of claim 9, wherein the instructions to extract the semantic feature distribution include instructions to apply the semantic-change model according to a logical time scale that accounts for the learned transient features according to a timestamp associated with the current sensor data and ones of the learned transient features that are associated with the timestamp, wherein the semantic-change model includes a semantic segmentation model and a change detection model, and wherein the semantic segmentation model is trained with images and extracts the features of the semantic feature distribution from the sensor data, and wherein the change detection model classifies the features of the semantic feature distribution as the sensed integral features and the sensed transient features.

14. A method of identifying changes to a location, comprising:

in response to receiving current sensor data about the location, extracting a semantic feature distribution from the current sensor data according to a semantic-change model that identifies sensed integral features and sensed transient features from the current sensor data associated with the location;

identifying a scene change to the location by determining whether the sensed integral features differ from learned integral features of a normal distribution that indicates both the learned integral features and learned transient features of the location;

updating a map of the location in response to identifying that one or more of the sensed integral features differ from the learned integral features of the normal distribution; and controlling one or more vehicle systems of the vehicle according to the map.

15. The method of claim 14, further comprising:

generating the normal distribution for the location as a function of aggregated sensor data collected over multiple passes through the location at different days and times of day, wherein the aggregated sensor data is labeled with timestamps that indicate days and times for respective observations of the aggregated sensor data, wherein generating the normal distribution includes analyzing the aggregated sensor data according to the semantic-change model using the timestamps to detect and learn the learned transient features of the location that change according to varying temporal aspects of the location, and wherein generating the normal distribution for the location is automatic and unsupervised.

16. The method of claim 14, wherein the current sensor data includes at least camera images, wherein the learned integral features are consistent features that are integral to the location and remain consistent over multiple observations of the location, and wherein the semantic-change model accounts for the learned transient features within the normal distribution to segment the sensed transient features from the semantic feature distribution when detected and avoid indicating the scene change according to the sensed transient features, and wherein the sensed transient features are aspects of the location detected in the current sensor data that correlate with the learned transient features.

17. The method of claim 14, wherein the semantic-change model characterizes aspects of the current sensor data to identify (i) the sensed integral features that correlate with the learned integral features and (ii) the sensed transient features that correlate with the learned transient features, and wherein the semantic-change model identifies the aspects to identify whether a potential scene change is one of the learned transient features that are ephemeral aspects of the location and not changes to the learned integral features.

18. The method of claim 14, wherein generating the semantic feature distribution accounts for the learned transient features of the location to focus analysis of whether the current sensor data includes the scene change on the sensed integral features instead of the sensed transient features that are temporary.

19. The method of claim 14, wherein extracting the semantic feature distribution from the current sensor data using the semantic-change model includes applying the semantic-change model according to a logical time scale that accounts for the learned transient features according to a timestamp associated with the current sensor data and ones of the learned transient features that are associated with the timestamp.

20. The method of claim 14, wherein the semantic-change model is comprised of a semantic segmentation model and a change detection model, wherein the semantic segmentation model is pretrained with images, wherein the extracting the semantic feature distribution includes using the semantic segmentation model to generate the semantic feature distribution, wherein the semantic segmentation model includes a fully connected convolutional neural network (FC-CNN), wherein the change detection model is trained using feature distributions produced by the semantic segmentation model and corresponding timestamps, and wherein the extracting the semantic feature distribution includes applying the change detection model to classify features within the semantic feature distribution as the sensed integral features and the sensed transient features.

* * * * *